United States Patent
Ram et al.

(10) Patent No.: US 8,897,483 B2
(45) Date of Patent: Nov. 25, 2014

(54) SYSTEM AND METHOD FOR INVENTORYING VEGETAL SUBSTANCE

(75) Inventors: Ehud Ram, Modiin (IL); Yoram Elichai, Ashdod (IL); Roi Shilo, Kibbutz Givat Brenner (IL)

(73) Assignee: Intelescope Solutions Ltd., Petach-Tikva (IL)

( * ) Notice: Subject to any disclaimer, the term of this patent is extended or adjusted under 35 U.S.C. 154(b) by 610 days.

(21) Appl. No.: 12/942,801

(22) Filed: Nov. 9, 2010

(65) Prior Publication Data

US 2012/0114185 A1      May 10, 2012

(51) Int. Cl.
*G06K 9/00* (2006.01)
*G06Q 10/08* (2012.01)
*G06Q 50/02* (2012.01)

(52) U.S. Cl.
CPC .............. *G06Q 50/02* (2013.01); *G06Q 10/087* (2013.01)
USPC .......................................... 382/100; 382/110

(58) Field of Classification Search
CPC . G06K 9/0063; G06K 9/00657; G01B 11/24; G01B 11/28; G05D 1/0251; A01G 1/00; A01G 23/00; B60W 2420/42; G01N 2021/8466; G01N 21/25; G01N 21/84; G01N 33/0098
See application file for complete search history.

(56) References Cited

U.S. PATENT DOCUMENTS

| | | | | |
|---|---|---|---|---|
| 5,764,819 A * | 6/1998 | Orr et al. | .................. | 382/110 |
| 5,886,662 A * | 3/1999 | Johnson | .................. | 342/25 A |
| 6,212,824 B1 * | 4/2001 | Orr et al. | .................. | 47/58.1 R |
| 6,792,684 B1 * | 9/2004 | Hyyppa | .................. | 33/1 A |
| 7,212,670 B1 * | 5/2007 | Rousselle | .................. | 382/173 |
| 7,639,842 B2 * | 12/2009 | Kelle et al. | .................. | 382/109 |
| 7,822,266 B2 * | 10/2010 | Wellington et al. | .................. | 382/154 |
| 7,917,346 B2 * | 3/2011 | Sullivan et al. | .................. | 703/11 |
| 8,208,689 B2 * | 6/2012 | Savolainen et al. | .................. | 382/110 |
| 8,275,547 B2 * | 9/2012 | Rousselle et al. | .................. | 702/2 |
| 8,306,273 B1 * | 11/2012 | Gravseth et al. | .................. | 382/106 |
| 8,538,695 B2 * | 9/2013 | Welty | .................. | 702/2 |
| 8,577,611 B2 * | 11/2013 | Ma | .................. | 702/2 |
| 2008/0319673 A1 | 12/2008 | Welty et al. | | |

FOREIGN PATENT DOCUMENTS

WO    WO 2010/111024     9/2010

OTHER PUBLICATIONS

International Search report mailed on Mar. 23, 2012 for PCT International Application No. PCT/IL2011/000852.

* cited by examiner

*Primary Examiner* — Manav Seth
(74) *Attorney, Agent, or Firm* — Pearl Cohen Zedek Latzer Baratz LLP (57) ABSTRACT

A system and method for computing an amount of timber that can be harvested from a plurality of trees is provided. An image related to a plurality of trees in a region may be obtained. A digital representation of the image may be analyzed to determine at least one of a presence, a location and/or a height of at least some of the trees. An inventory report related to an amount of timber that may be harvested may be generated based on at least one of the presence, location and/or a height of trees in the region.

10 Claims, 4 Drawing Sheets

SYSTEM AND METHOD FOR INVENTORYING VEGETAL SUBSTANCE

BACKGROUND OF THE INVENTION

Inventorying volume of substance in a specific region may be applicable to, and used in, a variety of fields. For example, inventorying volume of vegetal substance may be used for monitoring environmental changes, e.g., in order to calculate a growth rate of plants. Another example may relate to the construction industry, and more particularly, a demolition of existing buildings that may precede a construction project. For example, in order to anticipate efforts and/or resources that may be required in order to transfer material (e.g., debris) from a demolition site, the volume of existing material on site may need to be calculated. Accordingly, a system and method enabling determination of volume of substance (that may be distributed over large areas) may be highly appreciated in various fields, industries and/or disciplines.

In particular, with relation to the timber industry, it may be highly desirable to accurately determine the amount of timber that may be harvested from a specific region prior to deploying expensive harvesting equipment or facilitating transportation of timer from the harvesting site. However, currently, inventorying of timber volume that may be harvested from a forest in a given region is performed by manually measuring a sample of trees in the region and, based on such sample measurement, estimating the volume of timber. Typically, a fraction, e.g., three percent (3%) of the trees in the relevant area are randomly selected, the diameter of the trunk of the selected trees is measured at a predefined height from the ground and, combined with an estimation of a density (e.g., number of trees per acre) the volume of timber that may be harvested is estimated.

Evidently, current methods for calculating timber volume and/or other related parameters are lacking, the currently employed process requires deployment of personnel on site, it may be time consuming and, most importantly, the end result is a mere estimation of substance volume that may be far from accurate. There is therefore a need in the art for a system and method to enable accurate and efficient inventorying of substance such as timber over large areas.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Current methods for inventorying or calculating volume of substance such as timber or lumber employ manual measurement of a sample of relevant objects (e.g., trees) and further employ estimating capacity or volume based on such measurements. In contrast, embodiments of the invention may enable accurate calculation of quality, volume, quantity, sum, amount, capacity of substance. In particular, a quantity or volume and quality of timber that may be harvested from a specific region or forest may be determined with a high level of accuracy. For the sake of clarity and simplicity, trees, lumber and timber will mainly be referred to herein, however, it will be understood that embodiments of the invention are not limited in this respect and may be employed in order to calculate or determine quality, volume, quantity or amount of any applicable substance, that may be natural or man made, e.g., crop fields, debris in a demolition site, soil, substance floating on water and the like. Accordingly, trees, lumber pulpwood and/or timber may be replaced by any applicable substance or matter in the discussion herein.

According to one embodiment of the invention, an image of the region of interest such as a section of a forest may be acquired. An acquired image may be processed and a number of digital models may be generated based on the acquired image. Exemplary digital models that may be generated may be a surface model that may be, for example, a surface defined by, or related to, the part of trees' canopies or treetops visible from above in a given region, a terrain surface model that may be related to the terrain of the region of interest and a height model that may be related to tallness of trees or other objects in the relevant region. Embodiments of the invention may enable determining an exact location of specific trees in the region of interest. A digital spatial density index may be calculated and may indicate tree density in specific locations of a region or a tree density related to specific trees in the region. Based on at least some of the calculated and/or computed models, one or more inventory parameters, values or indicators may be computed. Such inventory parameters may be or may indicate a volume of substance, e.g., a volume of timber in a region or forest, a quality of timber, a per tree or per region stem density value and/or other related parameters or indicators.

Figure 1:
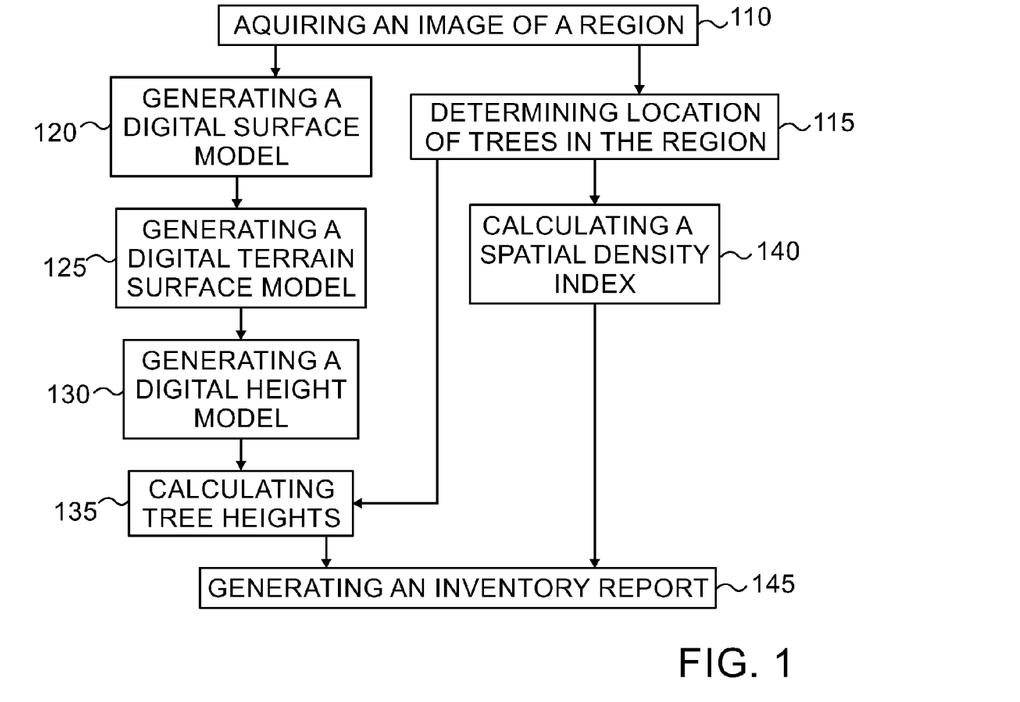
FIG. 1 is an exemplary flowchart describing a method of generating an inventory according to embodiments of the invention.
Figure 2:
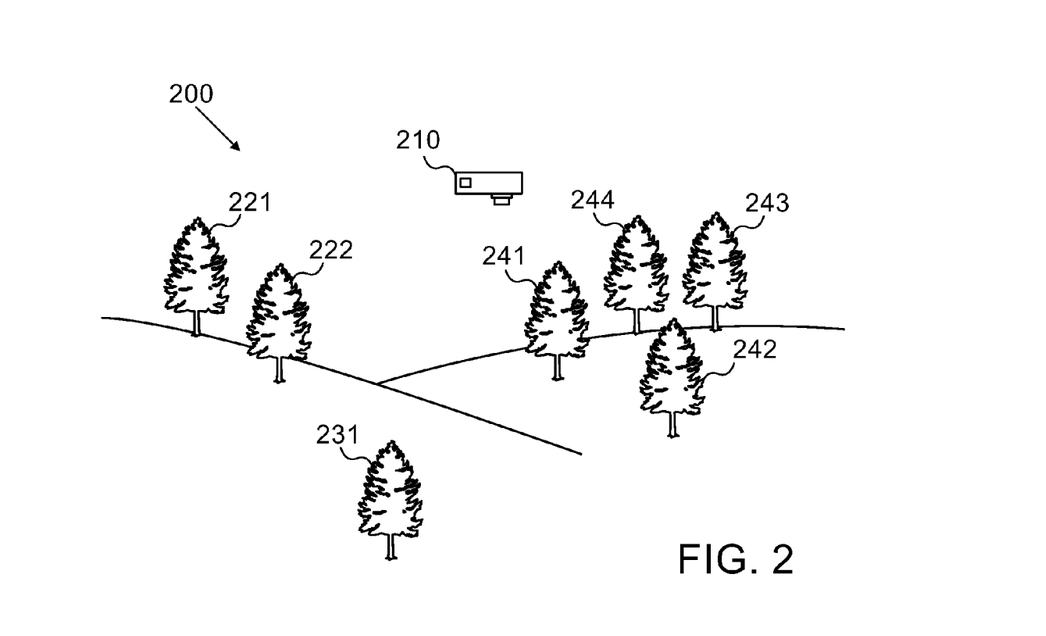
FIG. 2 shows an exemplary region applicable to embodiments of the invention.

Reference is now made to FIG. 1 that shows an exemplary flowchart describing a method of generating an inventory according to embodiments of the invention. As shown by block 110, the method may comprise acquiring an image of a region. Any suitable image acquisition device or system may be used to acquire an image as shown by block 110. For example, an airborne digital or other camera or imager as known in the art may be used to acquire an image of a forest. Various technologies such as radar based imaging, infrared imaging and the like may likewise be used. The device or system used for acquiring an image may be chosen such that any required attributes, properties or parameters of the resulting image are achieved. For example, the image acquisition system may be chosen based on the required resolution, spectral bands or wavelengths captured etc. It will be understood that embodiments of the invention are not limited by the type, nature, design, operational parameters or other aspects of the image acquisition device or system used nor by similar aspects of the image acquired. Reference is additionally made to FIG. 2 showing an exemplary region 200, trees 221, 222, 231 and 241-244 and image acquisition device 210. As shown, image acquisition device 210 may be located such that a top view image of region 200 and trees or other substance therein may be acquired. For the sake of simplicity and clarity, only a single image acquisition device 210 is shown. However, it will be understood that any applicable number of image acquisition devices may be employed as required. For example, two or more such devices may be located such that two or more images related to two or more angles or viewpoints are acquired thus enabling stereoscopic techniques as known in the art to be employed as further described herein.

Figure 3:
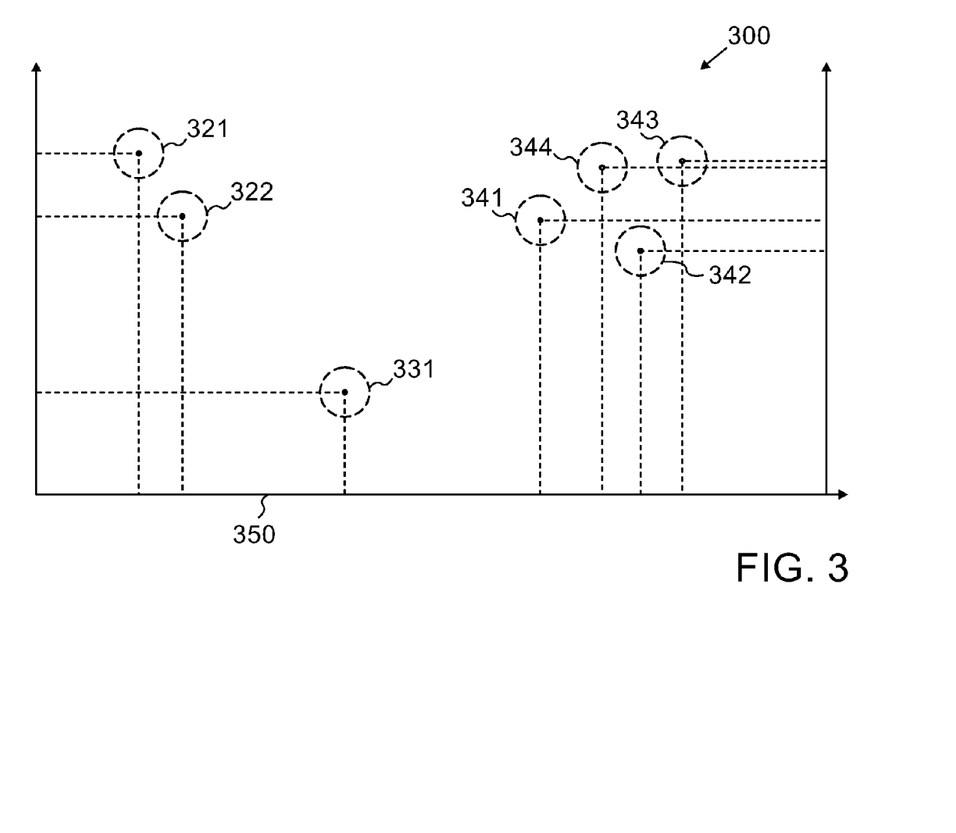
FIG. 3 shows an exemplary schematic view of an image according to embodiments of the invention.

As shown by block 115, the method may comprise determining location of trees in the region. Determining location of trees in a region may comprise determining a location, e.g., as expressed in coordinates, of each tree in the region. Reference is additionally made to FIG. 3 showing a schematic view of an image 300 of region 200 that may have been acquired by imaging device 210. As shown, FIG. 3 comprises top view images 321, 322, 331, and 341-344 that may be images of trees 221, 222, 231, and 241-244 respectively. As further shown, a location of trees 221, 222, 231, and 241-244 may be determined by observing the coordinates of images 321, 322, 331, and 341-344 with respect to coordinate system 350. In some embodiments, coordinate system 350 may be a geographic coordinate system, namely, one which enables any location on earth to be specified by two or three coordinates. In other embodiments, coordinate system 350 may be any applicable or convenient coordinate system, e.g., a two dimensional coordinate system. For example, coordinate system 350 may be a relative coordinate system (e.g., an artificial two dimensional coordinate system superimposed on an image) that may be used for various computations as described herein and may further be converted to a geographic coordinate system when a need arises. For example, in order to compute the volume of timber in a region as described herein, a relative or other coordinate system may be used throughout the process, however, if or when a need arises to locate a specific tree or visit a specific site in a region, the relative or other coordinate system may be converted to a geographic coordinate system.

In some embodiments, determining the location of trees in a region may comprise identifying the geographical location of trees. In particular, in some embodiments, a center, top or other predefined point related to trees' canopies may be identified and the exact geographic location of such identified point may be determined and further associated with the location of the relevant tree. Various methods may be employed in order to identify and/or determine a predefined point (e.g., center or top) related to a tree or a tree's canopy. For example, image spectral data analysis may be used in order to determine the geographical position of a center or top of a tree's canopy as described herein. For example, based on specific or other known parameters related to trees in a region the topmost or center of a canopy may be identified. For example, the topmost part and/or center of a canopy of trees in a region may have a different color than the rest of the tree, e.g., the top part of trees may have a light green color due to new growth while other parts of the tree may be dark green. Such may be the case since new leaves are of lighter color than older ones. In such cases, a center and/or top of a canopy may be identified based on color variations. Other tree types may exhibit other phenomena, e.g., other colors or a specific shape of specific parts of the tree. Any such attributes may be taken into account when processing an image of a region and when further analyzing an image in order to locate trees in a region.

In some embodiments, a location or presence of a tree may be based on historical data. For example, a first and second images of a specific location, obtained at different times, may be compared. In such case, assuming the first image predates the second, identifying, at a specific location, bare terrain in the first image and a suspected tree in the second image may cause embodiments of the invention to determine that a tree is indeed located at the specific location. Any number of images taken during over any period of time may be used in order to utilize historical data as described herein. Accordingly, embodiments of the invention may enable identifying trees where prior art may fail to do so. Any other objects, e.g., buildings, piles of substance etc. may be identified based on historical or predated images or other information as descried herein. While identifying bare terrain as described herein may be used in order to subsequently identifying a tree, any other historical data may be applicable. For example, it may be suspected that a tree is located in a specific location based on an obtained image but information extracted from the image may not be sufficient in order to reach a definite conclusion. A subsequent image of the same location may be used to identify changes over time of the "suspected tree". For example, a specific tree may change shape over time according to a known progress path, e.g., the canopy size, shape and/or color may change according to a well known and/or recorded pattern. Accordingly, by identifying changes of an object as exhibited by a number of images obtained over time embodiments of the invention may identify objects such as trees and further determine their exact location and/or other related parameters as described herein. In yet other embodiments, while a tree may be identified, its exact location may not be determined, for example, identifying the center of the tree's canopy may not be possible based on an acquired image. In such case, a subsequent image of the same tree may be used in order to determine the exact location of the tree. As described herein, the progress or pattern according to which a tree grows and/or evolves may be known. Such pattern may be used in order to determine an exact location of the tree. For example, by identifying a specific change (that may be according to a predicted path or pattern) of the canopy in a series of images taken over a sufficient period of time, the center of the canopy and/or exact location of the tree may be identified.

In one embodiment, a two dimensional array of pixels of an image acquired as described herein may be processed in order to identify and/or locate trees in a region. A pixel in such array may be denoted by its respective coordinate values (e.g., as related to coordinate system 350), namely, P(x,y) may denote the pixel located at the point denoted by the respective X and Y coordinates. As described herein, the coordinates may be relative, e.g., a mesh superimposed on an image or they may be coordinates as used in maps or other cartographic data. Pixels in an image may be associated with values that correspond to their color. For example, a low value of one (1) may be assigned to, or associated with, dark green pixels and a high value of ten (10) may be assigned to, or associated with, light green pixels and similarly, other colors or shades may be associated with respective values ranging from one to ten or any applicable range.

For each pixel, a two dimensional second degree polynomial may be used in order to approximate the distribution of values associated with surrounding pixels. For example, the polynomial $P(X,Y)=a_{00}+a_{10}X+a_{10}Y+a_{20}X^2+a_{11}XY+a_{02}Y^2$ may be used to represent the value of pixel P(X,Y) which is the pixel at coordinates X and Y. As known in the art, by selecting the appropriate coefficients $a_{00}, a_{10}, a_{10}, a_{20}, a_{11}$ and $a_{02}$ the polynomial shown above may approximate the plane formed by values of pixels. Such polynomial may be used to represent the values of pixels in a predefined distance from a selected pixel. For example, in one embodiment, the approximation described above may be used for pixels which are not distant more than 5, 9 or 11 pixels from a selected pixel. Such constraint may be expressed by only observing pixels that satisfy {Pkn, |k−i|<=d} and {Pkn, |n−j|<=d} where "d" is the distance in pixels from the selected pixel, e.g., "d" may be 5, 9 or 11 pixels and "i" and "j" assume values such that the above constraint is met for any pixel located at coordinates k and n. As known in the art, the above polynomial may be transformed to a simpler polynomial, for example, $P(X,Y)=b_{00}+b_{10}X+b_{01}Y+\lambda_1 X^2+\lambda_2 Y^2$. In such case, if both $\lambda_1$ and $\lambda_2$ are positive or both are negative, then a maximum value may be close to, or in the vicinity of, pixel P(X,Y). The location of such maximum (that may be related to a treetop) may be more precisely determined by the coordinates $(-b_{10/2}\lambda_1, b_{01/2}\lambda_2)$. Accordingly, a tree top or a center of a tree's canopy may be located. An automated and/or computerized process may be repeated for some or all pixels in an image acquired as described herein such that all treetops may be identified based on a color difference between the treetop and the rest of the tree. Accordingly, all trees in a region may be identified and/or located with high precision. It will be understood that the method and/or algorithm described herein are exemplary one and that various other methods, e.g., as known in the field of image processing may be used to locate trees based on an acquired image and the color attributes of different sections of a tree. In other embodiments, other attributes or aspects may be taken into account. For example, the canopy of a specific species or type of tree may have a unique or distinct shape, for example, as viewed from above. In such case, processing of an acquired image may identify occurrences of such known shape and thus identify individual trees.

According to embodiments of the invention, various parameters or aspects related to trees may be computed, deduced, calculated or determined, e.g., by performing analysis of a captured image as described herein. For example, based on a tree and/or canopy shape, color, height, width, foliage volume, foliage density and the like parameters such as a tree's age, a tree's type, class or category may be determined. Likewise, based on analysis and/or parameters described herein, a tree's condition may be determined. For example, analysis related to a color of a tree may reveal or enable determining if a tree is dead or alive, whether the tree is dry or undernourished, or otherwise determine a tree's condition. Parameters and aspects determined as described herein may be of great value to the timber industry. For example, the quality, volume, specific gravity, stem density and other aspects or parameters related to timber may be deduced, calculated or computed based on parameters and analysis described herein. Such information may be vital when planning and/or conducting harvesting of wood or timber, namely, when parameters such as wood or lumber quantity and/or quality are of great importance and/or relevance.

As shown by block 140, the method may comprise calculating a spatial density index (SDI). Calculating a SDI value for a specific tree may comprise associating the tree with a parameter, indicator, index or value representing density or presence of neighboring trees. In other embodiments, a SDI value may be calculated for one or more points, locations, regions or curves other than that of a specific tree. Calculating or computing a SDI parameter or value may be based on determining location of trees in the region as described with respect to block 115. For example, using coordinates of trees in a region as shown by FIG. 3, a SDI value may be computed for any point, location, area or tree in a region.

Figure 4:
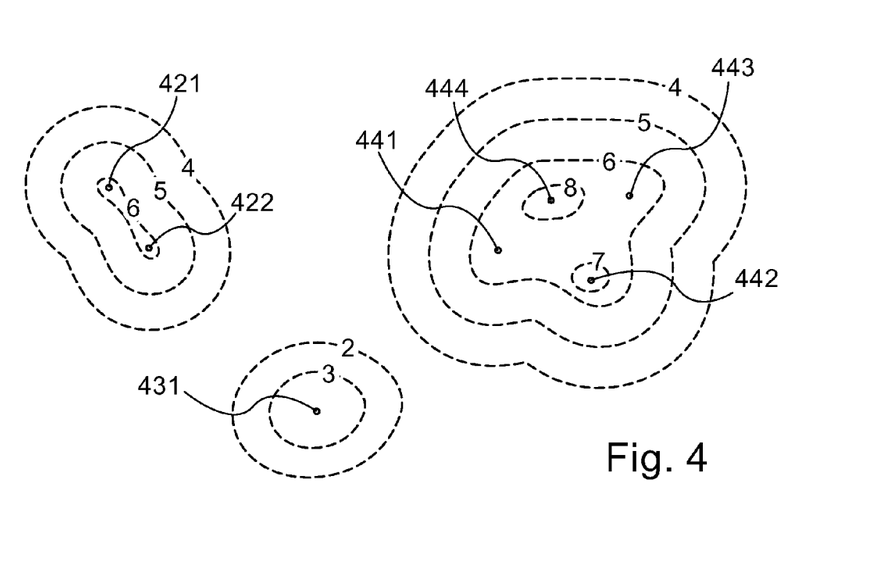
FIG. 4 shows an exemplary distribution of a spatial density index (SDI) according to embodiments of the present invention.

Reference is additionally made to FIG. 4 showing an exemplary distribution of a spatial density index according to embodiments of the present invention. FIG. 4 comprises points 421, 422, 431 and 441-444 that are respectively related to trees 221, 222, 231, and 241-244 shown in FIG. 2. As shown by the dashed lines in FIG. 4, a SDI value may be a function of tree density at a given point or location, including a point that coincides with a location of an individual or specific tree. For example, the SDI value at point 421 (where tree 212 is located) may be 6 in an exemplary and simplified scale. For example, such scale may range from zero (0) for bare terrain to ten (10) for the highest density observed or possible. As shown, the same SDI value may be computed at point 422 (related to tree 222). Such may be the case when trees 221 and 222 are relatively close together and are also distant from other trees, accordingly, the SDI value associated with these two trees may mainly be influenced by, or a function of, these two trees. As shown, the SDI value around and/or at point 444 which is associated with tree 244 may be high (8) due to nearby trees (namely, trees 241-244). As further shown, a relatively low value of a SDI may be calculated at point 431 where relatively isolated tree 231 is located. As further shown by the dashed lines, a continuous SDI may exhibit field like attributes, namely, the SDI value may decrease with increased distance from tree locations or presence. As described herein, embodiments of the invention may utilize discrete values of a SDI, e.g., as computed at exact, specific and discrete tree locations or, alternatively or additionally, a region or curve related SDI, e.g., in a predefined vicinity of a group of trees. A SDI value may be used to determine various aspects or parameters. For example, the higher the SDI value the taller the trees may be. Possibly in conjunction with information such as type of trees in the region, a SDI value or other parameter may enable determining aspects such as general shape of trees, e.g., tall and narrow trees may be expected where a SDI value is high.

As shown by block 120, the method may comprise generating a digital surface model. A digital surface model (DSM) may be a two-dimensional surface containing selected points in a three-dimensional space. For example, selected points may be all points visible to, or at a line of sight of, an image acquisition device located above a region of interest. For example, all points of region 200 visible to device 210 shown in FIG. 2. Accordingly, points at treetops, buildings' roofs or any surface, object or substance visible from a birds-eye view, an aerial view or aerial viewpoint may be used for generating a DSM that may represent the surface of topmost or highest points in a region.

In some embodiments, rather than contain actual points in real space, e.g., highest points in a region, a DSM may contain points that may be calculated by relating actual or real points or locations in space to a predefined surface, plane, parameter or other reference. For example, a DSM may represent an elevation of a set of points from a reference level, surface or plane. For example, a DSM may represent an elevation above mean sea level (MSL) of points in a region. For example, using stereoscopic techniques as known in the art, an altitude, or height of objects captured in an image (possibly captured by two or more image acquisition devices) may be determined. By subtracting MSL from such determined height, a relative height parameter or measure may be calculated for any point in a region. Such relative parameter may be used to generate a DSM that may represent relative height as related to MSL.

Figure 5:
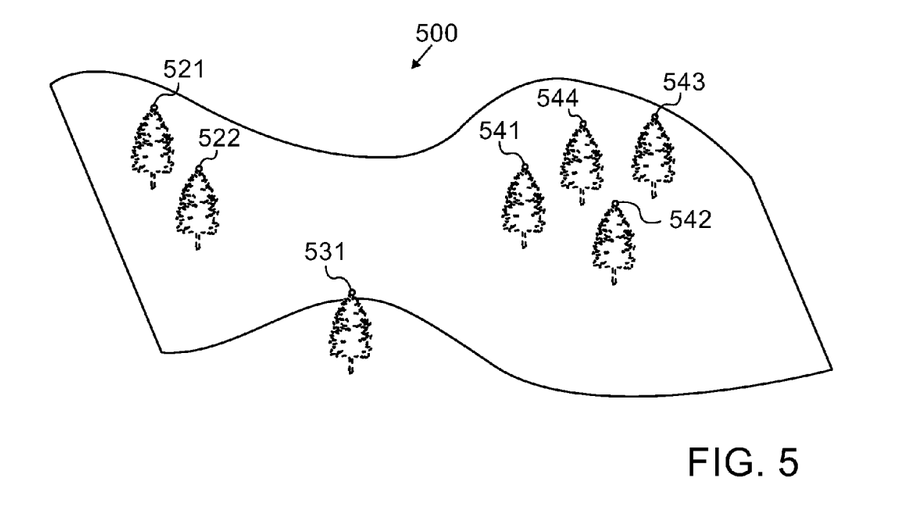
FIG. 5 shows an exemplary visual representation of a digital surface model (DSM) according to embodiments of the present invention.

For example, a digital image may be digitally represented by data objects such as pixels as known in the art. Pixels (or their digital representation) may each be associated with the smallest addressable captured element. Metadata may be associated with, or computed based on, such pixels. For example and as known in the art, an altitude may be computed for, and associated with, each pixel in an image. According to embodiments of the invention, a DSM may be generated by generating a set of pixels or other digital objects that may be produced by subtracting a reference parameter such as a MSL from an altitude or height parameter associated with original pixels in an image. Accordingly, a set of pixels representing the relative height associated with the original pixels and further with respect to a reference point may be produced. Such set of pixels (or digital objects representing such set) may be referred to herein as a DSM or a digital elevation model. Reference is additionally made to FIG. 5 showing an exemplary visual representation of a digital surface model (DSM) 500 that may be related to region 200. For example, selected points in a DSM may be all points visible to, or at a line of sight of, image acquisition device 210 such as treetops or other objects in region 200. As shown by points 521, 522, 531 and 541-544, DSM 500 may include the topmost point of trees 221, 222, 231 and 241-244. As further exemplified by DSM 500, a DSM may curve upwards where high objects are located, e.g., around points 541-544 representing the top points of trees 241-244 or around point 531 representing the top point of tree 231.

As shown by block 125, the method may comprise generating a digital terrain surface model or digital terrain model (DTM). According to embodiments of the invention, a terrain surface model may be generated by producing a digital representation of the underlying terrain. For example, pixels of points where bare terrain is visible to the image acquisition system may be used in order to generate such model. In some embodiments, interpolation and/or extrapolation techniques may be used in order to generate a terrain surface model from a small number or partial set of pixels. For example, not all locations or points of an underlying terrain in a forest may be visible and, accordingly, pixels representing all points may not be obtainable. In such cases, pixels obtainable may be used to artificially generate missing pixels such that an adequate representation of the terrain may be produced. In some embodiments, instead of or in addition to identifying locations where trees are located, locations where no trees are present may be identified and recorded. Such locations (where no trees are identified) may be used in order to generate a DTM. For example, if no tree or other identifiable object is identified in a specific location then one or more pixels related to such specific location may be related to the underlying terrain and may further be used in generating a DTM. Otherwise described, by identifying no known or recognized object in a location, pixels related to the location may be assumed to represent bare terrain.

In other embodiments, cartographic data may be used. For example, if the region of interest is adequately mapped, a map may be digitized (e.g., converted into digital information comprising pixels and associated metadata as described herein). Such digitized map may be used to produce a digital terrain surface model that may represent the terrain in terms of height. For example, a digital terrain model may comprise a set of pixels or other digital objects where each such object is associated with a height parameter. Accordingly, a DTM may be a digital representation of the surface of the terrain in a region of interest.

Figure 6:
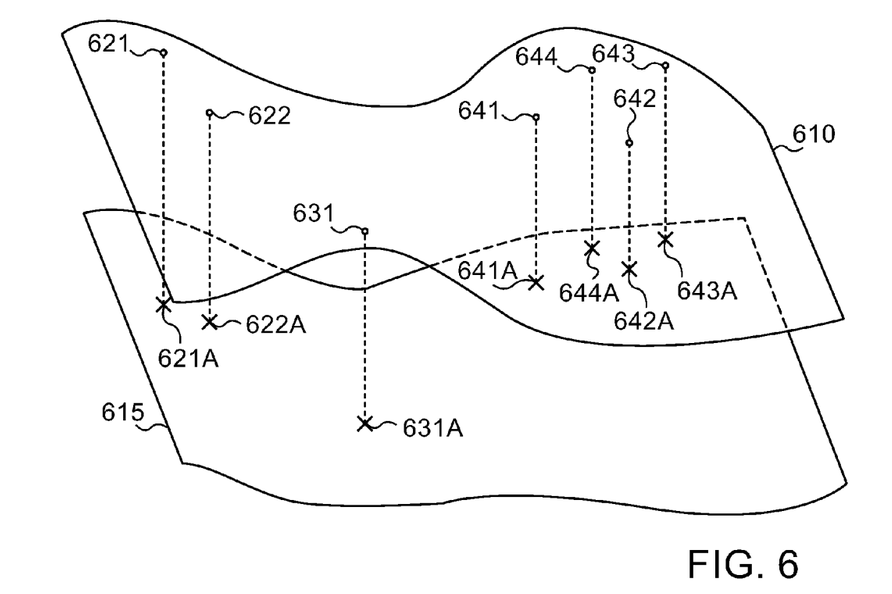
FIG. 6 shows an exemplary visual representation of a digital surface model (DSM) and an exemplary digital terrain model (DTM) according to embodiments of the present invention.

As shown by block 130, the method may comprise generating a digital height model (DHM). Generally stated, a DHM may be produced by subtracting a DTM from a DSM according to the general equation: DHM=(DSM-DTM). Reference is additionally made to FIG. 6 showing and exemplary DSM and an exemplary DTM according to embodiments of the invention. FIG. 6 shows a DSM 610, a DTM 615, a set of points (that may be pixels) 621, 622, 631 and 641-644 on DSM 610 that may correspond to trees 221, 222, 231 and 241-244 respectively. As further shown by the dashed lines connecting points 621, 622, 631 and 641-644 on DSM 610 with respective points 621A, 622A, 631A and 641A-644A on DTM 615, the distance between respective points represents the height, tallness, elevation or vertical distance of each point from, or with respect to, the underlying terrain. For example, the tallness of tree 231 may be represented by the dashed line connecting points 631 and 631A. According to embodiments of the invention, a DHM may be generated by subtracting a height parameter associated with each pixel in a DTM from the height parameter associated with the corresponding DSM pixel. Accordingly, a DHM may be a set of pixels, parameters or values where each pixel, parameter or value in the set is associated with a height value that is the height or distance of that pixel from the underlying bare terrain. Accordingly, the height, tallness, elevation or vertical distance of any point on DSM 610 from the underlying terrain (represented by DTM 615) may be computed. In particular, by identifying the location of specific trees, e.g., using information produced as described herein with respect to FIG. 3, the actual tallness of each and every tree (or other object) in a forest or region may be computed.

Although the description herein is mainly related to trees, timber and other related aspects it will be recognized that various other fields may be applicable and mainly referring to trees as done herein is meant to serve simplicity, focus and clarity as well as describe a preferred embodiment of the invention. Other embodiments may relate to crop fields, demolition sites and any applicable substance or scenarios. For example, a growth rate of crop fields may be calculated by comparing or otherwise relating two or more DHM's generated over time, or a progress in a construction site may be monitored by relating sequential DHM's related to the site and generated based on images obtained at different times.

As shown by block 135, the method may comprise calculating tree heights. As described herein, by relating a specific or individual tree to a DHM described herein, e.g., by positioning or locating the specific tree in the DHM as shown by FIG. 6, a tallness or height of each specific tree may be calculated. In other embodiments, an average tallness of trees in a region may likewise be calculated. A database or other storage may be used to record any parameters, information or relevant data. For example, a growth rate of a forest may be monitored by periodically computing tree attributes such as height and comparing or otherwise relating results or parameters over time.

In some embodiments, a height or tallness of a tree may be calculated or computed by identifying the tree and its location as described herein, identifying bare terrain in a vicinity of the tree, calculating the elevation of the tree (e.g., the tree top) and the surrounding terrain and subtracting the elevation of the tree from the elevation of the surrounding terrain. In some embodiments, an average terrain elevation may be computed for a given region and such average elevation may be used to calculate a height or tallness of a number of trees in the region. Although a terrain may be identified as described herein, e.g., by determining that no trees are located at a specific location, other objects or items may exist in a region. For example, rivers, valleys or creeks or roof tops may exist in a region, and although no trees may be identified in association with such items, embodiments of the invention may employ various rules or criteria such that these items are not mistaken for terrain. For example, sharp color differences (e.g., between bare terrain and river or roof) may be detected and a section having a color different from its surroundings may be omitted or ignored when computing a DTM or when calculating a tree's height by comparing elevations as described herein.

Another Method to Calculate Tree Height:

As shown by block 145, the method may comprise generating an inventory report. For example, based on tree heights, canopy sizes and number of trees in a region, SDI and/or other relevant parameters such as volume, quantity, quality, weight or other timber related parameters may be computed and presented, e.g., with respect to a predefined region or area or a specific tree. An inventory produced as shown by block 145 may comprise per tree information, e.g., tallness or height, timber volume, timber quality and the like may be reported for each tree in a forest. Likewise, aggregated data or information may be generated, e.g., total or aggregated timber volume or weight that may be harvested from a region etc. An inventory produced as shown by block 145 may comprise a SDI value or indicator as described herein. As would be evident to a person having ordinary skill in the art, such inventory and/or other information with an accuracy level as described herein can not be generated or produced by current methods and may further be of high value to the timber industry.

Figure 7:
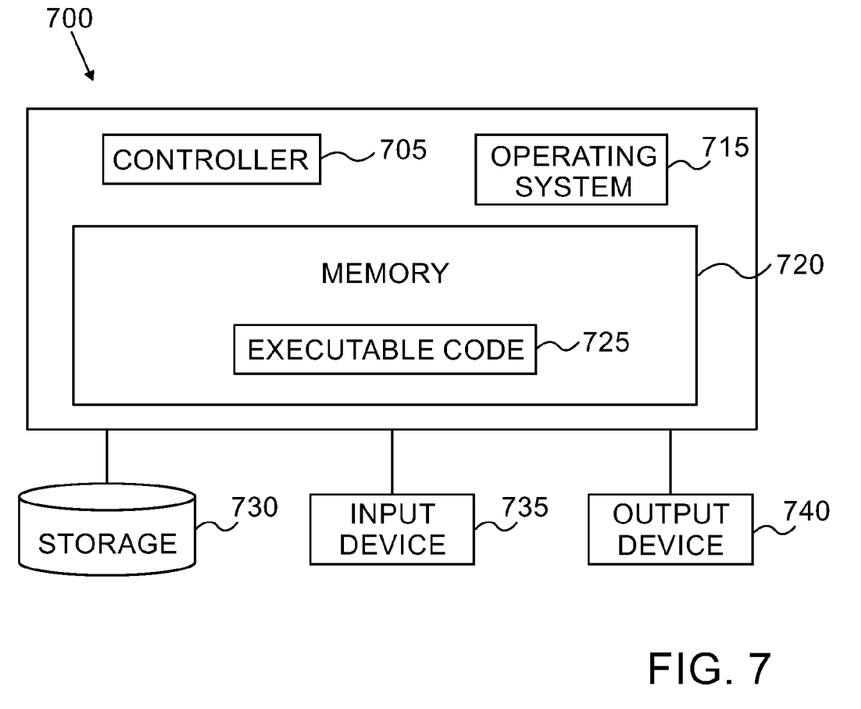
FIG. 7 shows a high level block diagram of an exemplary computing device according to embodiments of the present invention.

Reference is made to FIG. 7, showing high level block diagram of an exemplary computing device according to embodiments of the present invention. Computing device 700 may include a controller 705 that may be, for example, a central processing unit processor (CPU), a chip or any suitable computing or computational device, an operating system 715, a memory 720, a storage 730, an input device 735 and an output device 740.

Operating system may be or may include any code segment designed and/or configured to perform tasks involving coordination, scheduling, arbitration, supervising, controlling or otherwise managing operation of computing device 700, for example, scheduling execution of programs. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different, memory units. Executable code 725 may be any executable code, e.g., an application, a program, a process, task or script. For example, executable code 725 may be an application configured to process images as described herein, e.g., identify and locate trees in a region based on an input digital image.

Executable code 725 may be executed by controller 705 possibly under control of operating system 715. Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. For example, a digital image receive via input device 735 may be stored on storage 730. Likewise, any resulting data or information, e.g., an inventory report described herein may be stored on storage 730, communicated over a network from storage 730 and/or presented on a display or otherwise presented by output device 740.

Input device 735 may be or may include a mouse, a keyboard, a touch screen or pad or any suitable input device. In some embodiments, input device 735 may be or may include a network interface card (NIC), a universal serial bus (USB) port and may further be used in order to receive a digital image to be processed by executable code 725. It will be recognized that any suitable number of input device may be operatively connected to computing device 700 as shown by block 735. Output device 740 may include one or more displays, speakers and/or any other suitable output device. It will be recognized that any suitable number of output device may be operatively connected to computing device 700 as shown by block 740. Any applicable input/output (I/O) devices may be connected to computing device 700 as shown by blocks 735 and 740. For example, a network interface card (NIC), a printer or facsimile machine, a universal serial bus (USB) device or external hard drive may be included in input device 735 and/or output device 740.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein. For example, a storage medium such as memory 720, computer-executable instructions such as executable code 725 and a controller such as controller 705. Some embodiments may be provided in a computer program product that may include a machine-readable medium, stored thereon instructions, which may be used to program a computer, or other programmable devices, to perform methods as disclosed above. Embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
    obtaining, by an image acquisition system, an image of a plurality of trees in a region;
    processing, by a computing device, said image to produce a digital representation of said image;
    analyzing said digital representation to determine, for each tree included in said plurality of trees, a center of a canopy of the tree;
    producing a digital surface model (DSM) related to said plurality of trees wherein said DSM contains at least some treetops of said plurality of trees and wherein said DSM represents a surface elevation from a predefined reference point;
    producing a digital terrain model (DTM), said DTM related to a terrain of a region related to said plurality of trees;
    producing a digital height model (DHM) by subtracting said DTM from said DSM; and
    determining a height of the at least some of said plurality of trees based on their respective center of a canopy and based on said DHM.

2. The method of claim 1, comprising computing, based on the height, an amount of timber that can be harvested from said plurality of trees.

3. The method of claim 1, wherein said DSM represents a surface elevation from a predefined reference point.

4. The method of claim 1, comprising generating a spatial density index (SDI) related to said plurality of trees and computing an amount of timber that can be harvested from said plurality of trees based on said SDI.

5. A system for inventorying a vegetal substance comprising:
    an image acquisition system to obtain an image of a plurality of trees in a region; and
    a computing device to:
        produce a digital representation of said image,
        analyze said digital representation to determine, for each tree included in said plurality of trees, a center of a canopy of the tree;
        produce a digital surface model (DSM) related to said plurality of trees wherein said DSM contains at least some treetops of said plurality of trees;
        produce a digital terrain model (DTM), said DTM related to a terrain of a region related to said plurality of trees;
        produce a digital height model (DHM) by subtracting said DTM from said DSM; and
        determining a height of the at least some of said plurality of trees based on their respective center of a canopy and based on said DHM.

6. The system of claim 5, wherein said computing device is to determine an amount of timber that can be harvested from said plurality of trees based on the height.

7. The system of claim 5, wherein said DSM represents a surface elevation from a predefined reference point.

8. The system of claim 5, wherein said computing device is to generate a spatial density index (SDI) related to said plurality of trees and to compute an amount of timber that can be harvested from said plurality of trees based on said SDI.

9. The method of claim 1, comprising determining a location of at least some of said trees based on their respective center of a canopy.

10. The system of claim 5, wherein said computing device is to determine a location of at least some of said trees based on their respective center of a canopy.

* * * * *